United States Patent
Heo et al.

(10) Patent No.: US 7,668,563 B2
(45) Date of Patent: Feb. 23, 2010

(54) METHOD FOR CONFIGURING GAIN FACTORS FOR UPLINK SERVICE IN RADIO TELECOMMUNICATION SYSTEM

(75) Inventors: Youn-Hyoung Heo, Suwon-si (KR); Ju-Ho Lee, Suwon-si (KR); Yujian Zhang, Beijing (CN); Joon-Young Cho, Suwon-si (KR); Young-Bum Kim, Seoul (KR); Yong-Jun Kwak, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 11/326,595

(22) Filed: Jan. 6, 2006

(65) Prior Publication Data

US 2006/0183428 A1 Aug. 17, 2006

(30) Foreign Application Priority Data

Jan. 6, 2005 (KR) ................. 10-2005-0001400
Feb. 4, 2005 (KR) ................. 10-2005-0010868

(51) Int. Cl.
*H04B 7/00* (2006.01)
(52) U.S. Cl. .................. 455/522; 455/452.1; 455/562.1
(58) Field of Classification Search .............. 455/522, 455/562.1; 370/318
See application file for complete search history.

(56) References Cited

U.S. PATENT DOCUMENTS

| 5,621,723 | A | * | 4/1997 | Walton et al. ............... 370/335 |
| 5,812,938 | A | * | 9/1998 | Gilhousen et al. ............. 455/69 |
| 6,823,194 | B2 | * | 11/2004 | Haim ........................ 455/522 |
| 6,862,458 | B2 | * | 3/2005 | Kanemoto et al. .......... 455/522 |
| 6,904,290 | B1 | * | 6/2005 | Palenius .................... 455/522 |
| 7,020,127 | B2 | * | 3/2006 | Iacono et al. ............... 370/342 |

2003/0040342 A1 * 2/2003 Coan et al. .................. 455/571

(Continued)

FOREIGN PATENT DOCUMENTS

EP 1 244 232 9/2002

(Continued)

OTHER PUBLICATIONS

"Uplink Spreading and Modulation", 3GPP TS 25.213 V6.1.0 (Dec. 2004), Published Dec. 2004, pp. 7-12.

(Continued)

*Primary Examiner*—Edward Urban
*Assistant Examiner*—Ganiyu Hanidu
(74) *Attorney, Agent, or Firm*—Roylance, Abrams, Berdo & Goodman, L.L.P.

(57) ABSTRACT

A method for configuring gain factors in a WCDMA telecommunication system is provided in which the gain factor for defining power required for normal reception of uplink data in an environment supporting an uplink service over an E-DCH can be configured using minimal signaling information. First gain factors for first TFs corresponding to a part of a TF set including a plurality of TFs available for an uplink service are received. One of the first TFs is determined as a reference TF for a second TF other than the first TFs in the TF set. Then, a second gain factor for the second TF is calculated using the first gain factor for the determined reference TF. The second gain factor is used for transmitting or receiving uplink data.

6 Claims, 15 Drawing Sheets

U.S. PATENT DOCUMENTS

| | | | |
|---|---|---|---|
| 2004/0102205 A1 | 5/2004 | Zhang et al. | |
| 2005/0043052 A1* | 2/2005 | Whinnett et al. | 455/522 |
| 2005/0143116 A1* | 6/2005 | Hsu et al. | 455/522 |
| 2006/0034226 A1* | 2/2006 | Gu et al. | 370/332 |

FOREIGN PATENT DOCUMENTS

| | | |
|---|---|---|
| EP | 1 473 849 | 11/2004 |
| EP | 1 478 198 | 11/2004 |
| GB | 2389021 * | 11/2003 |
| JP | 2002-171557 | 6/2002 |
| KR | 2003-0018112 | 3/2003 |
| KR | 2006-0024757 | 3/2006 |

OTHER PUBLICATIONS

"Setting of the Uplink DPCCH/DPDCH Power Differences", 3GPP TS 25.214 V6.4.0 (Dec. 2004), Published Dec. 2004, pp. 20-22.

* cited by examiner

| TFI | $N_{info}$ |
|---|---|
| 0 | 128 |
| 1 | 256 |
| 2 | 512 |
| 3 | 768 |
| 4 | 1024 |
| 5 | 2048 |
| 6 | 3072 |
| 7 | 4096 |
| 8 | 5120 |
| 9 | 6144 |
| 10 | 7168 |
| 11 | 8192 |

FIG.3

| Information Element/Group name | Need | Multi | Type and reference | Semantics description |
|---|---|---|---|---|
| CHOICE Gain Factors | MP | | | |
| >Signalled Gain Factors | | | | |
| >>CHOICE mode | | | | |
| >>>FDD | | | | |
| >>>>Gain Factor $\beta_c$ | MP | | Integer (0..15) | For UL DPCCH or control part of PRACH or PCPCH |
| >>>TDD | | | | (no data) |
| >>Gain Factor $\beta_d$ | MP | | Integer (0..15) | For UL DPDCH or data part of PRACH or PCPCH in FDD and all uplink channels in TDD |
| >>Reference TFC ID | OP | | Integer (0..3) | If this TFC is a reference TFC, indicates the reference ID. |
| >Computed Gain Factors | | | | |
| >>Reference TFC ID | MP | | Integer (0..3) | Indicates the reference TFC Id of the TFC to be used to calculate the gain factors for this TFC. In case of using computed gain factors, at least one signalled gain factor is necessary for reference. |

FIG.4

| TFI | TB size | OPTIMAL GF | GF CALCULATION (METHOD 1) | ERROR OF METHOD 1 | GF CALCULATION (METHOD 2) | ERROR OF METHOD 2 | # of DPDCH(s) |
|---|---|---|---|---|---|---|---|
| 0 | 405 | 28 | Reference | 0 | 28 | Reference | 1 |
| 1 | 540 | 32 | 32 | 0 | 32 | 0.00 | 1 |
| 2 | 675 | 35 | 36 | 0.24 | 35 | Reference | 1 |
| 3 | 945 | 42 | 43 | 0.2 | 41 | -0.21 | 1 |
| 4 | 1215 | 33 | 34 | 0.26 | 33 | 0.00 | 2 |
| 5 | 1755 | 40 | 41 | 0.21 | 40 | 0.00 | 2 |
| 6 | 2295 | 32 | 33 | 0.27 | 32 | 0.00 | 4 |
| 7 | 2835 | 36 | 37 | 0.24 | 36 | 0.00 | 4 |
| 8 | 3375 | 39 | 40 | 0.22 | 39 | 0.00 | 4 |
| 9 | 3915 | 34 | 36 | 0.5 | 34 | 0.00 | 6 |
| 10 | 4455 | 37 | 38 | 0.23 | 37 | 0.00 | 6 |
| 11 | 4995 | 40 | 40 | 0 | 40 | Reference | 6 |
| 12 | 5535 | 43 | 42 | -0.2 | 42 | -0.20 | 6 |
| 13 | 6075 | 44 | 44 | 0 | 44 | 0.00 | 6 |
| 14 | 6615 | 46 | 46 | 0 | 46 | 0.00 | 6 |
| 15 | 7155 | 48 | 48 | 0 | 48 | 0.00 | 6 |
| 16 | 7695 | 50 | 50 | 0 | 50 | 0.00 | 6 |
| 17 | 8235 | 52 | 52 | 0 | 52 | 0.00 | 6 |

FIG.5

| Information Element/Group name | Need | Multi | Type and reference | Semantics description |
|---|---|---|---|---|
| CHOICE Gain Factors | MP | | | |
| >Signalled Gain Factors | | | | |
| >>CHOICE mode | | | | |
| >>>FDD | | | | |
| >>>>Gain Factor $\beta_c$ | MP | | Integer (0..15) | For UL DPCCH or control part of PRACH or PCPCH |
| >>>TDD | | | | (no data) |
| >>Gain Factor $\beta_e$ | MP | | Integer (0..15) | For UL DPDCH or data part of PRACH or PCPCH in FDD and all uplink channels in TDD |
| >Computed Gain Factors | | | | (no data) |

FIG.6

| Indicator of Signalled TF k | Reference TFI RTFI(k) | TB size | Gain factor | Number of E-DPDCH(s) |
|---|---|---|---|---|
| 0 | 0 | 405 | 28 | 1 |
| 1 | 2 | 675 | 35 | 1 |
| 2 | 11 | 4995 | 40 | 6 |

FIG.7

| TFI (i) | TB size | Reference TFI (Ref_TFI_i) | Gain factor |
|---|---|---|---|
| 0 | 405 | RTFI(0)=0 | 28 |
| 1 | 540 | 0 | 32 |
| 2 | 675 | RTFI(1)=2 | 35 |
| 3 | 945 | 2 | 41 |
| 4 | 1215 | 2 | 33 |
| 5 | 1755 | 2 | 40 |
| 6 | 2295 | 2 | 32 |
| 7 | 2835 | 2 | 36 |
| 8 | 3375 | 2 | 39 |
| 9 | 3915 | 2 | 34 |
| 10 | 4455 | 2 | 37 |
| 11 | 4995 | RTFI(2)=11 | 40 |
| 12 | 5535 | 11 | 42 |
| 13 | 6075 | 11 | 44 |
| 14 | 6615 | 11 | 46 |
| 15 | 7155 | 11 | 48 |
| 16 | 7695 | 11 | 50 |
| 17 | 8235 | 11 | 52 |

FIG.8

| Indicator of Signalled TF k | Reference TFI RTFI(k) | TB size | Gain factor | Number of E-DPDCH(s) |
|---|---|---|---|---|
| 0 | 1 | 540 | 33 | 1 |
| 1 | 10 | 4455 | 38 | 6 |
| 2 | 17 | 8235 | 54 | 6 |

FIG.10

| TFI (i) | TB Size | Reference TFI (Ref_TFI_i) | Gain factor |
|---|---|---|---|
| 0 | 405 | 1 | 29 |
| 1 | 540 | RTFI(0)=1 | 0 |
| 2 | 675 | 10 | 36 |
| 3 | 945 | 10 | 43 |
| 4 | 1215 | 10 | 34 |
| 5 | 1755 | 10 | 41 |
| 6 | 2295 | 10 | 33 |
| 7 | 2835 | 10 | 37 |
| 8 | 3375 | 10 | 41 |
| 9 | 3915 | 10 | 36 |
| 10 | 4455 | RTFI(1)=10 | 0 |
| 11 | 4995 | 17 | 42 |
| 12 | 5535 | 17 | 44 |
| 13 | 6075 | 17 | 46 |
| 14 | 6615 | 17 | 48 |
| 15 | 7155 | 17 | 50 |
| 16 | 7695 | 17 | 52 |
| 17 | 8235 | RTFI(2)=17 | 54 |

FIG.11

| Indicator of Signalled TF k | Reference TFI RTFI(k) | TB size | Gain factor | Number of E-DPDCH(s) |
|---|---|---|---|---|
| 0 | 1 | 540 | 32 | 1 |
| 1 | 6 | 2295 | 32 | 4 |
| 2 | 14 | 6615 | 41 | 6 |

FIG.13

| TFI (i) | TB size | Reference TFI (Ref_TFI_i) | Gain factor |
|---|---|---|---|
| 0 | 405 | 1 | 29 |
| 1 | 540 | RTFI(0)=1 | 33 |
| 2 | 675 | 1 | 37 |
| 3 | 945 | 1 | 43 |
| 4 | 1215 | 6 | 34 |
| 5 | 1755 | 6 | 41 |
| 6 | 2295 | RTFI(1)=6 | 33 |
| 7 | 2835 | 6 | 37 |
| 8 | 3375 | 6 | 40 |
| 9 | 3915 | 6 | 35 |
| 10 | 4455 | 6 | 39 |
| 11 | 4995 | 14 | 42 |
| 12 | 5535 | 14 | 44 |
| 13 | 6075 | 14 | 46 |
| 14 | 6615 | RTFI(2)=14 | 48 |
| 15 | 7155 | 14 | 50 |
| 16 | 7695 | 14 | 52 |
| 17 | 8235 | 14 | 54 |

FIG.14

| Indicator of Signalled TF k | Reference TFI RTFI(k) | TB size | Gain factor | Number of E-DPDCH(s) | Initial code rate |
|---|---|---|---|---|---|
| 0 | 0 | 405 | 28 | 1 | 0.22 |
| 1 | 4 | 1215 | 33 | 2 | 0.32 |
| 2 | 6 | 2295 | 32 | 4 | 0.30 |
| 3 | 9 | 3915 | 34 | 6 | 0.34 |
| 4 | 13 | 6075 | 44 | 6 | 0.53 |

FIG.16

| TFI (i) | TB size | Reference TFI (Ref_TFI_i) | Gain factor | Number of E-DPDCH(s) | Initial code rate |
|---|---|---|---|---|---|
| 0 | 405 | RTFI(0)=0 | 28 | 1 | 0.22 |
| 1 | 540 | 0 | 32 | 1 | 0.29 |
| 2 | 675 | 0 | 35 | 1 | 0.36 |
| 3 | 945 | 0 | 41 | 1 | 0.50 |
| 4 | 1215 | RTFI(1)=4 | 33 | 2 | 0.32 |
| 5 | 1755 | 4 | 40 | 2 | 0.46 |
| 6 | 2295 | RTFI(2)=6 | 32 | 4 | 0.30 |
| 7 | 2835 | 6 | 36 | 4 | 0.37 |
| 8 | 3375 | 6 | 39 | 4 | 0.44 |
| 9 | 3915 | RTFI(3)=9 | 34 | 6 | 0.34 |
| 10 | 4455 | 9 | 37 | 6 | 0.39 |
| 11 | 4995 | 9 | 40 | 6 | 0.43 |
| 12 | 5535 | 9 | 42 | 6 | 0.48 |
| 13 | 6075 | RTFI(4)=13 | 44 | 6 | 0.53 |
| 14 | 6155 | 13 | 46 | 6 | 0.58 |
| 15 | 7155 | 13 | 48 | 6 | 0.62 |
| 16 | 7695 | 13 | 50 | 6 | 0.67 |
| 17 | 8235 | 13 | 52 | 6 | 0.72 |

FIG.17

METHOD FOR CONFIGURING GAIN FACTORS FOR UPLINK SERVICE IN RADIO TELECOMMUNICATION SYSTEM

PRIORITY

This application claims priority under 35 U.S.C. §119(a) to applications entitled "Method for Configuring Gain Factors for Uplink Service in Radio Telecommunication System" filed in the Korean Industrial Property Office on January 6 and Feb. 4, 2005 and assigned Serial Nos. 2005-0001400 and 2005-0010868, respectively, the entire contents of both of which are hereby incorporated by reference.

BACKGROUND OF THE INVENTION

1. Field of the Invention

The present invention relates to a Wideband Code Division Multiple Access (hereinafter referred to as "WCDMA") telecommunication system. More particularly, the present invention relates to a method for configuring gain factors while reducing signaling overhead in an Enhanced Uplink Dedicated Channel (hereinafter referred to as "E-DCH" or "EUDCH") for an uplink service.

2. Description of the Related Art

A Universal Mobile Telecommunication Service (hereinafter referred to as "UMTS") system, which is a $3^{rd}$ generation mobile telecommunication system based upon European mobile communication systems (i.e., Global System for Mobile Communications (GSM) and General Packet Radio Services (GPRS)) and employing a WCDMA scheme, provides uniform services which enable cellular phone users or computer users to transmit packet-based text, digitized voice, video or multimedia data at a higher speed than 2 Mbps no matter where they are located.

The UMTS system uses an E-DCH in order to further improve performance of packet transmission in a reverse communication, that is, an uplink (UL) communication from a User Terminal or User equipment (hereinafter referred to as "UE") to a Node B. In order to provide more stable high-speed data transmission, the E-DCH supports various techniques such as Adaptive Modulation and Coding (hereinafter referred to as "AMC"), Hybrid Automatic Retransmission Request (hereinafter referred to as 'HARQ'), Node-B controlled scheduling, shorter Transmission Time Interval (hereinafter referred to as "TTI") length and so forth.

The AMC is a technique for improving resource use efficiency by determining a modulation scheme and a coding scheme for a data channel according to channel conditions between a Node B and a UE. A combination of the modulation scheme and the coding scheme is called: a Modulation and Coding Scheme (hereinafter referred to as "MCS"), and many MCS levels may be defined according to supportable modulation schemes and coding schemes. The AMC determines the MCS level according to channel conditions between a Node B and a UE, thereby improving the resource use efficiency.

The HARQ refers to a technique in which, when errors occur in an initially transmitted data packet, the packet is retransmitted in order to compensate for the erroneous packet. This HARQ may be classified into a Chase Combining (hereinafter referred to as "CC") technique and an Incremental Redundancy (hereinafter referred to as "IR") technique. In the CC technique, packets having the same format as that at initial transmission are retransmitted when errors occur. In the IR technique, packets having the different format than that at initial transmission are retransmitted when errors occur.

The Node B-controlled scheduling is a scheme in which a Node B determines whether to transmit uplink data on an upper limit value of possible data rates and transmits the determined information as scheduling allocation information to a UE when data is transmitted using an E-DCH. In turn, the UE determines a possible data rate of an uplink E-DCH with reference to the scheduling allocation information.

The shorter TTI length permits a TTI shorter than 10 ms corresponding to a minimum TTI of a typical Dedicated Channel (DCH), thereby reducing retransmission time and thus enabling high system throughput.

FIG. 1 is a view for explaining uplink packet transmission over an E-DCH in a typical radio telecommunication system. In the drawing, reference numeral "100" designates a base station supporting an E-DCH service, that is, a Node B, and reference numerals "101", "102", "103" and "104" designate UEs using the E-DCH service. As shown in FIG. 1, the UEs 101, 102, 103, 104 transmit data to the Node B 100 over E-DCHs 111, 112, 113, 114, respectively.

Using data buffer statuses, requested data rates or channel condition information of the UEs 101 to 104, the Node B 100 informs each UE 101 to 104 of whether or not E-DCH data transmission is possible for the corresponding UE or performs a scheduling operation for coordinating E-DCH data rates. The scheduling is performed in such a manner that lower data rates are assigned to UEs far away from the Node B 100 (for example, the UEs 103, 104) and higher data rates are assigned to UEs near to the Node B (for example, the UEs 101, 102), while a measured Noise Rise or Rise over Thermal (hereinafter referred to as "RoT") value of the Node B does not exceed a target value in order to enhance the overall system performance.

FIG. 2 is a message flowchart illustrating typical transmission/reception procedures over an E-DCH.

Referring to FIG. 2, in step 202, an E-DCH is set up between a Node B and a UE. This E-DCH setup is implemented through processes of transmitting/receiving messages over a dedicated transport channel. In step 204, the UE informs the Node B of scheduling information comprising transmission power information of the UE, which represents uplink channel conditions, information on transmission power margin which the UE can transmit, the amount of data, which are stacked up in a buffer of the UE and awaiting transmission, and so on.

In step 206, the Node B monitors scheduling information of a plurality of UEs including the above-mentioned UE in order to schedule data transmissions of the plurality of UEs. In step 208, using the scheduling information received from the UE, the Node B determines to grant packet transmission to the UE and transmits scheduling assignment information to the UE. The scheduling assignment information comprises a granted data rate and granted transmission timing.

In step 210, using the scheduling assignment information, the UE determines a Transport Format (hereinafter referred to as "TF") signifying a transmission rate and transmission power of the E-DCH. The UE transmits uplink packet data over the E-DCH according to the TF in step 214, and preferably simultaneously transmits the TF information to the Node B in step 212 Here, the TF information comprises a Transport Format resource Indicator (hereinafter referred to as "TFRI") representing information on resources necessary for receiving the E-DCH. In step 214, the UE also selects a MCS level in consideration of the data rate assigned by the Node B and channel conditions, and transmits the uplink packet data by using the MCS level.

In step 216, the Node B determines if errors occur in the TF information and the packet data. In step 218, the Node B transmits NACK (Negative Acknowledge) over an ACK/NACK channel when the determination proves both or either of the TF information and the packet data to be erroneous, or transmits ACK (Acknowledge) over the ACK/NACK channel when the determination proves both of the TF information and the packet data to have no errors. The packet data transmission is completed and the UE transmits new user data over the E-DCH when the Node B transmits the ACK, but the UE retransmits packet data having the same contents as those of the previously transmitted packet data over the E-DCH when the Node B transmits the NACK.

In the environment described above, the Node B improves the overall system performance by assigning lower data rates to UEs far away from the Node B that have worse channel conditions or are to be provided with a low priority data service, and assigning higher data rates to UEs near to the Node B that have better channel condition or are to be provided with a high priority data service.

TFs of an E-DCH, to which the Node B-controlled scheduling technique, the HARQ technique and the like are applied, are diversely configured according to service types and data rates. The respective TFs define the overall size of an E-DCH Transport Block (hereinafter referred to as "TB") by the size and number data blocks, and thus represent individual data rates different from each other. TF sets available for the E-DCH are configured such that they have various data rates in order to efficiently transmit a Protocol Data Unit (hereinafter referred to as "PDU") transferred from an upper layer with as little padding as possible. For example, the total number of TF sets for the E-DCH is about 128 to 256.

FIG. 3 illustrates an example of typical TF configuration. As shown in the drawing, TF Index (hereinafter referred to as "TFI") 0 to TFI 11 identifying TFs indicate TB size $N_{info}$ in a range of 128 to 8192 bits, respectively.

In order to transmit a transport channel for the E-DCH, a Dedicated Physical Data Channel for E-DCH (hereinafter referred to as "E-DPDCH") has been introduced in a physical layer. Power required to stably transfer data over the E-DPDCH is determined by configuring a gain factor representing a power ratio of the E-DPDCH to a Dedicated Physical Control Channel (hereinafter referred to as "DPCCH"), which is used as a pilot channel.

The gain factor has different values from TF to TF because the amount of overall power requirement is different according to transmission rates. In other words, since data reception performance is determined by transmission bit energy, that is, $E_b$, packet transmission quality of the system is maintained only by keeping the transmission bit energy constant. In order to keep the transmission bit energy constant, the amount of overall power requirement differs from transmission rate to transmission rate.

Hereinafter, a description will be given of a method for configuring gain factors for an uplink Dedicated Physical Data Channel (hereinafter referred to as "DPDCH"), to which an uplink Dedicated Channel (hereinafter referred to as "DCH") is mapped, on a TF-by-TF basis.

A network represented by a Radio Network Controller (hereinafter referred to as "RNC") configures transmission power, which is necessary for each TF to maintain constant quality, by using gain factors. A gain factor configuration method is classified into a signaled gain factor scheme and a computed gain factor scheme. In the signaled gain factor scheme, the network informs a UE of TF-by-TF gain factors through upper layer signaling. In the computed gain factor scheme, the network informs a UE only of gain factors for a reference TF Combination (hereinafter referred to as "TFC") representing a combination of reference TFs and transport channels, and the UE personally calculates and determines gain factors for the other TFs based on the gain factors for the reference TFC.

The conventional computed gain factor scheme is expressed by the following Equation (1). As described below, a ratio of a gain factor for a specific TFC to a gain factor for a reference TFC is given as a ratio of a transmission rate for a desired TFC and a transmission rate for the reference TFC:

$$A_j = \frac{\beta_{d,ref}}{\beta_{c,ref}} \cdot \sqrt{\frac{L_{ref}}{L_j}} \sqrt{\frac{K_j}{K_{ref}}} \quad (1)$$

where, $A_j$ denotes a power ratio of a DPDCH to a DPCCH for a desired j-th TF. $\beta_{d,ref}$ and $\beta_{c,ref}$ denote a DPDCH gain factor and a DPCCH gain factor for a reference TF, respectively, $L_{ref}$ denotes the number of DPDCHs necessary for supporting a reference TFC, and $L_j$ denotes the number of DPDCHs necessary for transmitting a desired j-th TFC. $K_{ref}$ and $K_j$ denote transport channel data sizes for the reference TFC and the j-th TFC, respectively, which are obtained as follows:

$$K_{ref} = \sum_i RM_i \cdot N_{i,ref} \quad (2)$$

$$K_j = \sum_i RM_i \cdot N_{i,j}$$

The transport channel data size is the sum of data bits of all transport channels mapped to a corresponding physical channel. The data bits of the respective transport channels are not multiplexed together, but pass through coding and rate matching according to weights of the respective transport channels and then are summated. A fraction of bits punched or repeated by the rate matching is determined by a rate matching attribute value RM disclosed through upper layer signaling. In Equation (2), $RM_i$ denotes a rate matching attribute value of an i-th transport channel, and $N_{i,ref}$ and $N_{i,j}$ denote data sizes after coding but before rate matching for the i-th transport channel. Therefore, $K_{ref}$ and $K_j$ become transport channel data size multiplexed after rate matching in a case of using the corresponding TFC.

Since a plurality of transport channels are mapped to one DPDCH, and these transport channels have different coding rates and rate matching ratios, the gain factors are calculated using data sizes to which rate matching attribute values RM are applied as stated above.

Once a value of $A_j$ representing the power ratio of the DPDCH to the DPDCCH is obtained in Equation (1), each gain factor can be derived from the value of $A_j$. That is, a gain factor for the j-th TFC is as follows:

If $A_j>1$, then $\beta_{d,j}=1.0$ and $\beta_{c,j}=1/A_j$, If $A_j<=1$, then
$\beta_{c,j}=1.0$ and $\beta_{d,j}=1/A_j$ \quad (3)

Both of the conventional gain factor configuration schemes require Radio Resource Control (hereinafter referred to as "RRC") signaling between the UE and the RNC. In the signaled gain factor scheme, since all TFs needed TF by TF are provided to the UE, significant signaling resources are consumed. Also, in the computed gain factor, the RNC must notify the UE of gain factors for the reference TFCs and information on the relationships between the respective TFCs and the reference TFCs through RRC signaling. Accordingly, the computed gain factor scheme also consumes significant signaling resources.

FIG. 4 illustrates information elements (hereinafter referred to as "IE") of a signaling message for the conventional gain factor configuration. As shown in the drawing, IE "CHOICE Gain Factors" for gain factor choice comprises IE "Signaled Gain Factors" and IE "Computed Gain Factors". In order to perform signaling of gain factors for reference TFCs, the IE "Signaled Gain Factors" comprises FDD and TDD fields representing whether a choice mode is a Frequency Division Duplex (FDD) mode or a Time Division Duplex (TDD) mode. When the choice mode is the FDD, a DPDCCH gain factor $\beta_c$, DPDCH gain factors $\beta_d$ for the respective reference TFCs, and reference TFC IDs for the respective TFCs are also included in the IE "Signaled Gain Factors". In addition, to apply the computed gain factor scheme to non-signaled TFCs, reference TFC IDs corresponding to the respective TFCs are included in the IE "Computed Gain Factors".

Accordingly, a need exists for a method for configuring gain factors in a WCDMA telecommunication system in which the gain factor for defining power required for normal reception of uplink data in an environment supporting an uplink service over an E-DCH can be configured using minimal signaling information.

SUMMARY OF THE INVENTION

Accordingly, the present invention has been made to solve at least the above-mentioned problems occurring in the prior art, and an object of the present invention is to provide a method for efficiently notifying gain factors necessary for E-DCH transmission.

A further object of the present invention is to provide a method for reducing upper signaling overhead required to perform signaling of reference TFCs necessary for gain factor calculation.

A further object of the present invention is to provide a method for using only minimal information for notifying parameters needed to determine E-DCH transmission power and for determining gain factors necessary for E-DCH transmission by using predefined rules.

In order to accomplish these objects, in accordance with one exemplary aspect of the present invention, there is provided a method for configuring gain factors in a radio telecommunication system, the method comprising the steps of: receiving first gain factors for first TFs corresponding to a part of a TF set including a plurality of TFs available for an uplink service; determining one of the first TFs as a reference TF for a second TF other than the first TFs in the TF set; and calculating a second gain factor for the second TF by using the first gain factor for the determined reference TF, the second gain factor being used for transmitting or receiving uplink data.

In accordance with another aspect of the present invention, there is provided a method for configuring gain factors in a radio telecommunication system, the method comprising the steps of: receiving first gain factors for first TFs corresponding to a part of a TF set including a plurality of TFs available for an uplink service; if an index of a second TF other than the first TFs in the TF set is equal to or greater than a last index among indexes of the first TFs, determining the first TF having the last index as a reference TF for the second TF; if an index of a second TF other than the first TFs in the TF set is less than the last index, and the index of the second TF is equal to or greater than a k-th index and is less than a (k+1)-th index of the indexes of the first TFs, determining the first TF having the k-th index as the reference TF for the second TF; and calculating a second gain factor for the second TF by using the first gain factor for the determined reference TF, the second gain factor being used for transmitting or receiving uplink data.

In accordance with another exemplary aspect of the present invention, there is provided a method for configuring gain factors in a radio telecommunication system, the method comprising the steps of: receiving first gain factors for first TFs corresponding to a part of a TF set including a plurality of TFs available for an uplink service; if an index of a second TF other than the first TFs in the TF set is less than a first index among indexes of the first TFs, determining the first TF having the first index as a reference TF for the second TF; and calculating a second gain factor for the second TF by using the first gain factor for the determined reference TF, the second gain factor being used for transmitting or receiving uplink data.

BRIEF DESCRIPTION OF THE DRAWINGS

The above and other objects, features and advantages of the present invention will be more apparent from the following detailed description taken in conjunction with the accompanying drawings, in which:

FIG. 3 is a view FIG. 3 illustrating an example of typical TF configuration;

FIG. 4 is a view illustrating information elements of a signaling message for a conventional gain factor configuration scheme;

FIG. 5 is a view illustrating a scheme in which gain factors for remaining TFs are calculated using a gain factor for a reference TF in accordance with an exemplary embodiment of the present invention;

FIG. 6 is a view illustrating information elements of a signaling message for gain factor configuration in accordance with an exemplary embodiment of the present invention;

FIG. 7 is view illustrating a set of signaled gain factors in accordance with a first exemplary embodiment of the present invention;

FIG. 8 is a view illustrating reference TFs configured in accordance with the first embodiment of the present invention;

FIG. 10 is view illustrating a set of signaled gain factors in accordance with a second exemplary embodiment of the present invention;

FIG. 11 is a view illustrating reference TFs configured in accordance with the second embodiment of the present invention;

FIG. 13 is view illustrating a set of signaled gain factors in accordance with a third exemplary embodiment of the present invention;

FIG. 14 is a view illustrating reference TFs configured in accordance with the third embodiment of the present invention;

FIG. 16 is view illustrating a set of signaled gain factors in accordance with a fourth exemplary embodiment of the present invention;

FIG. 17 is a view illustrating reference TFs configured in accordance with the fourth embodiment of the present invention.

DETAILED DESCRIPTION OF THE EXEMPLARY EMBODIMENTS

Figure 1:
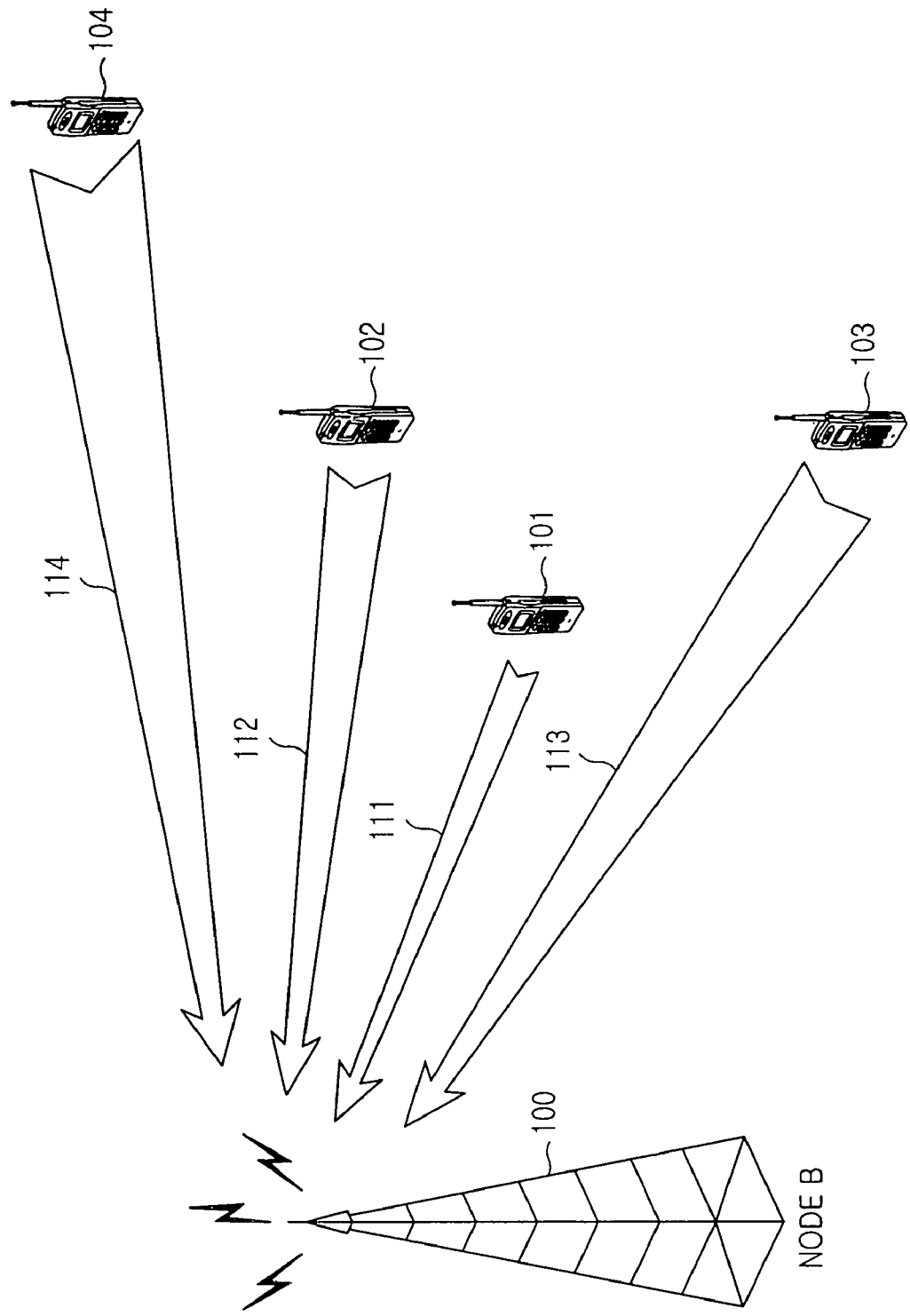
FIG. 1 is a view for explaining uplink packet transmission over an E-DCH in a radio telecommunication system.
Figure 2:
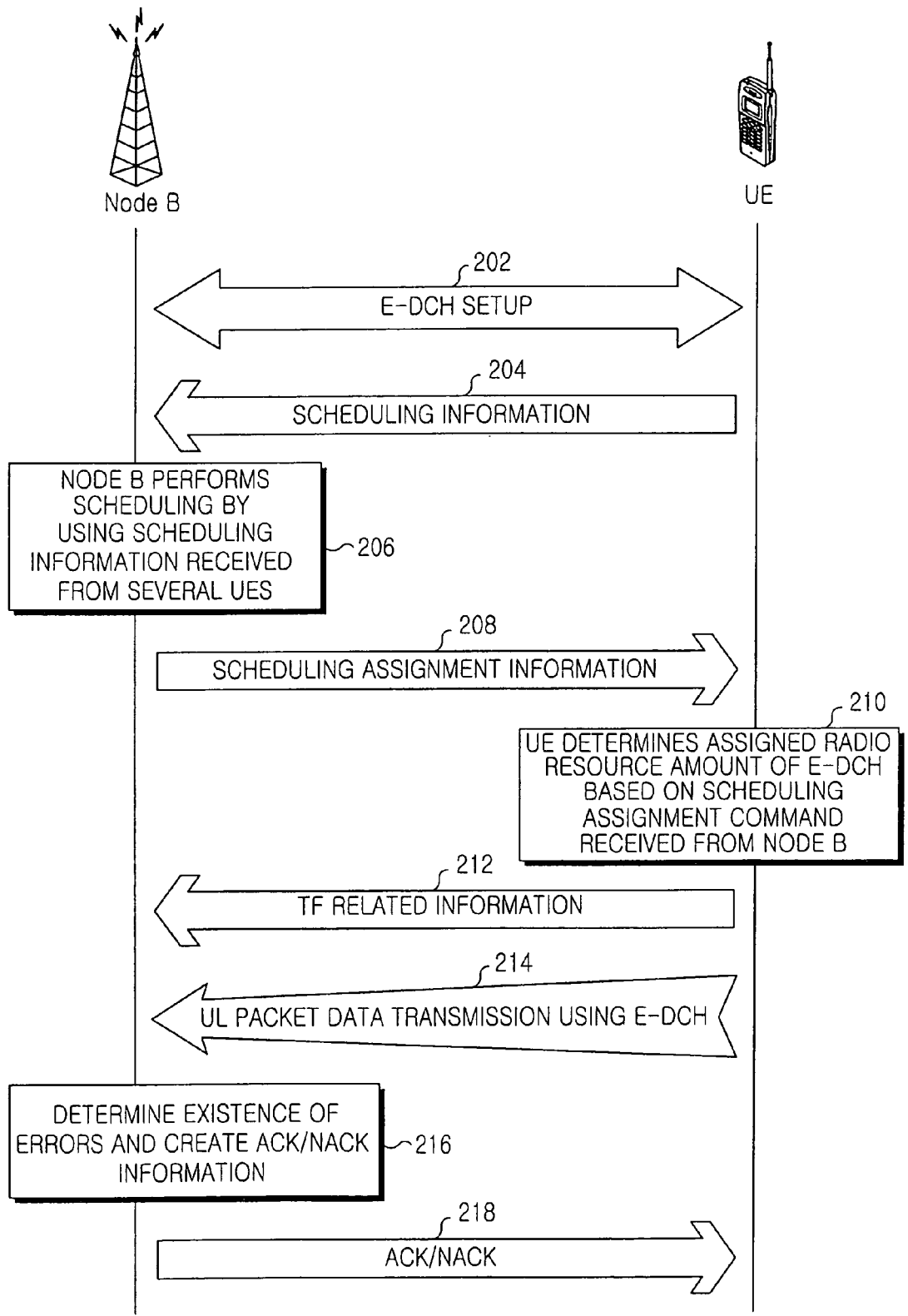
FIG. 2 is a message flowchart illustrating typical transmission/reception procedures over an E-DCH.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted for conciseness.

An important aspect of the present invention is to determine gain factors necessary for power setup of a UE in order to transmit uplink data over an E-DCH. To this end, a Node B needs to know the power level of the UE, and thus each of the UE and the Node B performs a gain factor determination operation as will be described below. However, for the convenience of explanation, the following description will be given on the assumption that the UE sets up power.

Prior to explaining preferred embodiments of the present invention, a description will be given first for an operation of using a reference TF and a gain factor corresponding to the reference TF for deriving gain factors for the other TFs of the E-DCH. Since only one transport channel is used in the E-DCH, a TFC includes only one TF. Thus, in the following description of preferred embodiments of the present invention, a term "TF" is used in place of a term "TFC". However, it is to be understood that the TF in the E-DCH has the same meaning as that of the TFC.

In this specification, for the facilitation of explanation, a DPCCH gain factor is assumed as an essentially constant value regardless of TFs. If the DPCCH gain factor is essentially constant, the above-mentioned Equation (1) can be simplified as the following Equation (4). That is, it is unnecessary to relate the ratio of RMs to Equation (1) because only one transport channel is used in the E-DCH, and the ratio of $K_j$ and $K_{ref}$ is simplified as a ratio of TB sizes. Thus, the following Equation (4) can be used in the E-DCH:

$$\beta_{e,j} = \beta_{e,ref} \sqrt{\frac{L_{ref}}{L_j}} \sqrt{\frac{N_{info,j}}{N_{info,ref}}} \qquad \text{(Eqn. 4)}$$

where, $N_{info,j}$ denotes the TB size of a j-th TF, and $N_{info,ref}$ denotes the TB size of a reference TF. If the DPCCH gain factor varies according to TFs, gain factors in Equation (4) can be regarded as a ratio of power levels, and thus it is possible to set a gain factor of one predetermined channel to 1 and to obtain gain factors of the other channels by using ratio values.

In addition, when several physical channels are used, a combination of a channelization code with a Spreading Factor (SF) of 2 and a channelization code with a SF of 4 can be used for the E-DCH, in contrast with the DPDCH using only one channelization code with a SF of 4. As a result of this, simply considering the number of physical channels for a corresponding TF, the number of physical channels cannot be discriminated SF by SF, so it is basically impossible to exactly calculate the gain factors. Thus, in consideration of the E-DCH environment, the present invention converts an L value used in the gain factor calculation into the equivalent number of physical channels for the case of SF=4, and then applies the converted L value to the gain factor calculation. In that case, the L value is as follows: if the SF is 2, $L_{SF=2}$ is defined as twice of the number of original physical channels, and if not, $L_{SF \neq 2}$ is defined as the number of original physical channels. Then, a gain factor in a case of SF=2 is obtained by applying the equivalent number of physical channels $L_{SF=2}$ to Equation (4) to derive a gain factor and applying the derived gain factor to an equation $\beta_{e,SF=2} = \sqrt{2} \times \beta_{e,ref}$.

FIG. 5 illustrates an example in which, using a reference gain factor for a signaled reference TF, gain factors for the remaining TFs are calculated in accordance with an exemplary embodiment of the present invention. The first column of FIG. 5 denotes TFIs identifying TFs, the second column denotes TB sizes for the TFs, and the third column denotes optimal gain factors capable of providing power required to satisfy a given Block Error Rate (BLER) performance. Here in FIG. 5 are optimal gain factors which have been derived from simulation or field tests such that they satisfy 1% BLER performance.

In order to implement the computed gain factor scheme of the present invnetion, a reference gain factor is needed. Such a reference gain factor is notified through upper signaling. That is, a gain factor=28 for reference TFI 0 of 405 bits is provided to a UE through upper signaling. When the DPCCH gain factor is fixed, only one transport channel is used for the E-DCH, and the number of necessary DPDCHs is the same, a gain factor of 32 is obtained by applying the computed gain factor scheme of Equation (4) (Method 1) to a TF of 540 bits. It is seen that the value "32" is the same as the optimal gain factor value shown in the third column of FIG. 5.

Similarly, if gain factors for all of the remaining TFs are derived by using TFI 0 as the reference TF, gain factors as presented in the fourth column of FIG. 5 are obtained. However, as seen from the fifth column of FIG. 5, there are considerable errors in gain factors for TFI 2 to TFI 10. This is because a low coding rate applied to small TB size requires plenty of power, and thus unnecessary excess power is set up if a gain factor for small TB size is used as a reference gain factor for obtaining gain, factors for the other TFs. However, with TFs of TFI 13 or above, errors decrease again. This is because an initial coding rate becomes higher, and thus power required per information bit increases again.

Consequently, in a more improved computed gain factor scheme (Method 2) shown in the sixth column of FIG. 5, TFs are classified into a case where they belong to a TF set having a small coding gain, a case where they have general TB sizes, and a case where they require much more power in a high coding rate, and separate reference TFs are set and used for the classified cases. The sixth and seventh columns of FIG. 5 show gain factors and their errors obtained using several reference TFs, that is TFI 0, TFI 2 and TFI 11. It can be seen from the seventh column that errors significantly decrease.

When several reference TFs are used as stated above, gain factors for desired TFs can be calculated with small errors. In a case of the DCH, a plurality of reference TFs are configured, and the corresponding reference TFs for all available TFs are provided to a UE to calculate gain factors for desired TFs.

However, in a case of the E-DCH, it is possible to have a neighboring reference TF of signaled reference TFs as a reference TF to calculate optimal gain factors without separately signaling reference TFs for all available TFs.

If required power changes due to small TF size, a high initial coding rate or the like, errors occur in a gain factor. In this case, if a TF located in a boundary region of the power alteration is set as a reference TF, TFs neighboring the reference TF have little error as compared with optimal gain factors. This tendency is due to the fact that, in contrast with the UL DCH, the E-DCH consists of one transport channel, and thus TFs of a TF set are arranged according to TB sizes.

Therefore, in an exemplary embodiment of the present invention, it is prearranged that reference TFs for all TFs of the E-DCH are not separately notified to a UE, and one of signaled reference TFs is used as a reference TF for each non-signaled TF. Consequently, there is no need to separately notify a reference TF necessary for calculating a gain factor for each TF, so upper signaling overhead can be reduced. That is, the UE determines a reference TF for a TF chosen for the E-DCH by using predefined rules. At this time, the UE uses a signaled gain factor for the determined reference TF for calculating a gain factor for the chosen TF.

When the computed gain factor scheme is used according to the exemplary embodiment of the present invention as stated above, the UE need not map and notify reference TFs for all TFs, and thus IEs of a RRC signaling message for gain factor configuration is simplified as shown in FIG. 6. Referring to FIG. 6, IE "CHOICE Gain Factors" for gain factor choice comprises IE "Signaled Gain Factors" and IE "Computed Gain Factors". In order to perform signaling of gain factors for reference TFs, the IE "Signaled Gain Factors" comprises FDD and TDD fields representing whether a choice mode is a FDD mode or a TDD mode. When the choice mode is the FDD, a DPDCCH gain factor $\beta_c$ and E-DPDCH gain factors $\beta_e$ for the respective reference TFs are also included in the IE "Signaled Gain Factors". $\beta_c$ is a gain factor for a control section of an E-DPCCH or a Physical random Access Channel)/PCPCH (Physical Common packet Channel (PRACH) in a case of the FDD, and $\beta_e$ is a gain factor for a data section of the E-DPCCH or the PRACH/PCPCH in a case of the FDD or for all uplink channels in a case of the TDD. Here, IE "Computed Gain Factors" for the computed gain factor scheme is included in the message only for representing the use of the computed gain factor scheme, and includes no additional information.

The UE acquires gain factors for TFs through the above-mentioned RRC signaling message. Thereafter, in order to calculate a gain factor for a TF chosen for the E-DCH, the UE selects one of the signaled TFs, which corresponds to the chosen TF, as a reference TF. Similarly, a Node B selects one of the signaled TFs, which corresponds to a TF notified from the UE over the E-DPCCH, as a reference TF in order to calculate a gain factor for the notified TF. A gain factor for the reference TF is used for calculating the gain factor for the chosen or notified TF. As an example, the Node B and the UE calculate a gain factor for a TF to be used by using the signaled TFs at every E-DCH transmission. As another example, the Node B and the UE previously calculate gain factors for all TFs of a TF set and store in a memory, and can read out a TF chosen for the E-DCH and a pre-calculated gain factor corresponding to the chosen TF from the memory and the use them.

Hereinafter, specific embodiments for choosing a reference TF will be described in further detail. In the following description, for the convenience of explanation, TFs gain factor of which have been acquired through a RRC signaling message will be referred to as "signaled TFs", and one TF chosen among them will be referred to as a "reference TF". Thus, it is to be understood that all the signaled TFs may become the reference TFs.

EXAMPLE 1

In Example 1, when it is intended to use the computed gain factor scheme, a TF is chosen for the E-DCH, and a signaled TF nearest to the chosen TF, from among signaled TFs having smaller TFIs or TB sizes than that of the chosen TF, is selected as a reference TF.

A TF set comprising of 18 TFs as stated above in connection with FIG. 5 is used for explaining this Example. Of such a TF set, gain factors for 3 TFIs, that is, TFI 0, TFI 2 and TFI 11 are notified as shown in FIG. 7.

Referring to FIG. 7, the first column denotes Indicators successively assigned to signaled TFs, that is, k, the second column denotes original indicators of the signaled TFs, that is, RTFI(k), third column denotes the TB sizes of the signaled TFs, and the fourth column denotes gain factors for the signaled TFs. In this way, only by signaling gain factors for some TFs, that is, TFI 0, TFI 2 and TFI 11, a UE can configure a reference TF for each TF from TFI 1, a gain factor of which is not signaled, to calculate its gain factor by using the reference TF.

If it is intended to derive a gain factor for TFI 1, RTFI(0)=0 of the signaled TFs, which is smaller than TFI 1 and simultaneously is nearest to TFI 1, becomes a reference TF for TFI 1. Similarly, in a case of TFI 3, RTFI(1)=2, which is smaller than TFI 3 and simultaneously is nearest to TFI 3, becomes a reference TF for TFI 3. By applying the same principle to all TFs included in the TF set, reference TFs for the respective TFs are selected as in FIG. 8.

As shown in FIG. 8, TFIs 0, 2 and 11 are the signaled TFs, the other TFIs are mapped to reference TFIs representing corresponding reference TFs, respectively. Here, if Ref_TFI_i denotes a reference TFI selected for an i-th TF, Ref_TFI_1 is TFI 0=RTFI(0), Ref_TFI_3 to Ref_TFI_10 are TFI 2=RTFI(1), and Ref_TFI_12 to Ref_TFI_17 are TFI 11=RTFI(2). Gain factors for the non-signaled TFIs are calculated according to a gain factor for the corresponding reference TFI.

Figure 9:
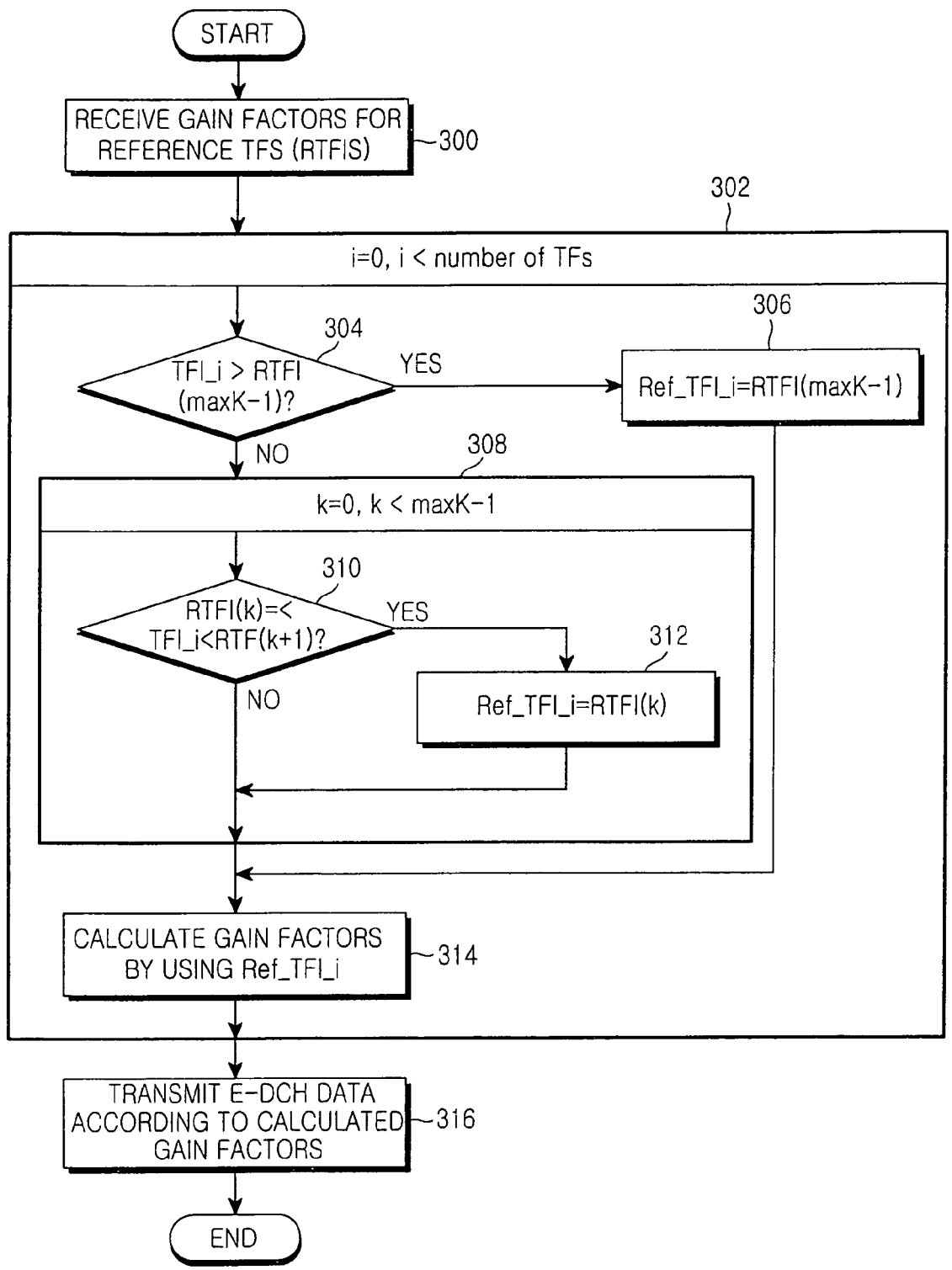
FIG. 9 is a flowchart illustrating an operation of configuring gain factors of a UE in accordance with the first embodiment of the present invention.

FIG. 9 is a flowchart illustrating an operation of configuring gain factors of a UE in accordance with Example 1 of the present invention. In all of the exemplary embodiments of the present invention, a UE stores a TF set, which is prearranged between the UE and a network, and comprises TFs available for the E-DCH between the UE and a network.

Referring to FIG. 9, in step 300, the UE receives gain factor values for maxK TFs from the network through RRC signaling. Here, RTFI denotes indexes of the signaled TFs, and are represented by RTFI(0) to RTFI(maxK−1). In step 302, in order to calculate a gain factor for each TF of the overall TF set, the UE repeats steps 304 and 314 as many as times corresponding to the number of the TFs of the TF set while increasing i one by one from 0. Here, i is an integer equal to or greater than 0 and smaller than the number of TFs of the overall TF set. At this time, since gain factors for TFIs the same as the RTFIs have been already provided to the UE in step 300, step 302 may be omitted for them.

First, in step 304, the UE determines if TFI_i indicating an i-th TFI is greater than the maximum reference TFI, that is, RTFI(maxK−1). If so, the UE proceeds to step 306 to set Ref_TFI_i indicating a reference TFI corresponding to TFI_i to RTFI(maxK−1). In next step 308, in order to compare TFI_i with maxK RTFIs, the UE repeats step 310 as many as (maxK−1) times while increasing k one by one from 0. Here, k is an integer equal to or greater than 0 and smaller than maxK−1. In step 310, the UE determines if TFI_i is equal to or greater than RTFI(k) and is smaller than RTFI(k+1). If TFI_i is equal to or greater than RTFI(k) and is smaller than RTFI(k+1) for a specific k, Ref_TFI_i is set to RTFI(k) in step 312.

In step 314, the UE calculates a gain factor for TFI-i by applying the gain factor for Ref_TFI_i, determined for TFI-i, to Equation (4). Here, the gain factor for TFI-i represented by Ref_TFI_i corresponds to $\beta_{e,ref}$ in Equation (4).

In step 316, the UE transmits E-DCH data according to the gain factors calculated in step 310 or signaled in step 300.

EXAMPLE 2

In Example 2, when it is intended to use the computed gain factor scheme, a TF is chosen for the E-DCH, and a signaled TF nearest to the chosen TF, from among signaled TFs having greater TFIs than that of the chosen TF, is selected as a reference TF.

A TF set comprising of 18 TFs as stated above in connection with FIG. 5 is used for explaining this Example. Of such a TF set, gain factors for 3 TFIs, that is, TFI 1, TFI 10 and TFI 17 are notified as shown in FIG. 10.

Referring to FIG. 10, the first column denotes Indicators successively assigned to signaled TFs, that is, k, the second column denotes original indicators of the signaled TFs, that is, RTFI(k), third column denotes the TB sizes of the signaled TFs, and the fourth column denotes gain factors for the signaled TFs. In this way, only by signaling gain factors for some TFs, that is, TFI 1, TFI 10 and TFI 17, a UE can configure a reference TF for each TF from TFI 0, a gain factor of which is not signaled, to calculate its gain factor by using the reference TF.

If it is intended to derive a gain factor for TFI 0, RTFI(0)=1 of the signaled TFs, which is greater than TFI 0 and simultaneously is nearest to TFI 0, becomes a reference TF for TFI 0. Similarly, in a case of TFI 2, RTFI(1)=10, which is greater than TFI 2 and simultaneously is nearest to TFI 2, becomes a reference TF for TFI 2. By applying the same principle to all TFs included in the TF set, reference TFs for the respective TFs are selected as in FIG. 11.

As shown in FIG. 11, TFIs 1, 10 and 17 are the signaled TFs, the other TFIs are mapped to reference TFIs representing corresponding reference TFs, respectively. Here, if Ref_TFI_i denotes a reference TFI selected for an i-th TF, Ref_TFI_0 is TFI 1=RTFI(0), Ref_TFI_2 to Ref_TFI_9 are TFI 10=RTFI(1), and Ref_TFI_11 to Ref_TFI_16 are TFI 17=RTFI(2). Gain factors for the non-signaled TFIs are calculated according to a gain factor for the corresponding reference TFI.

Figure 12:
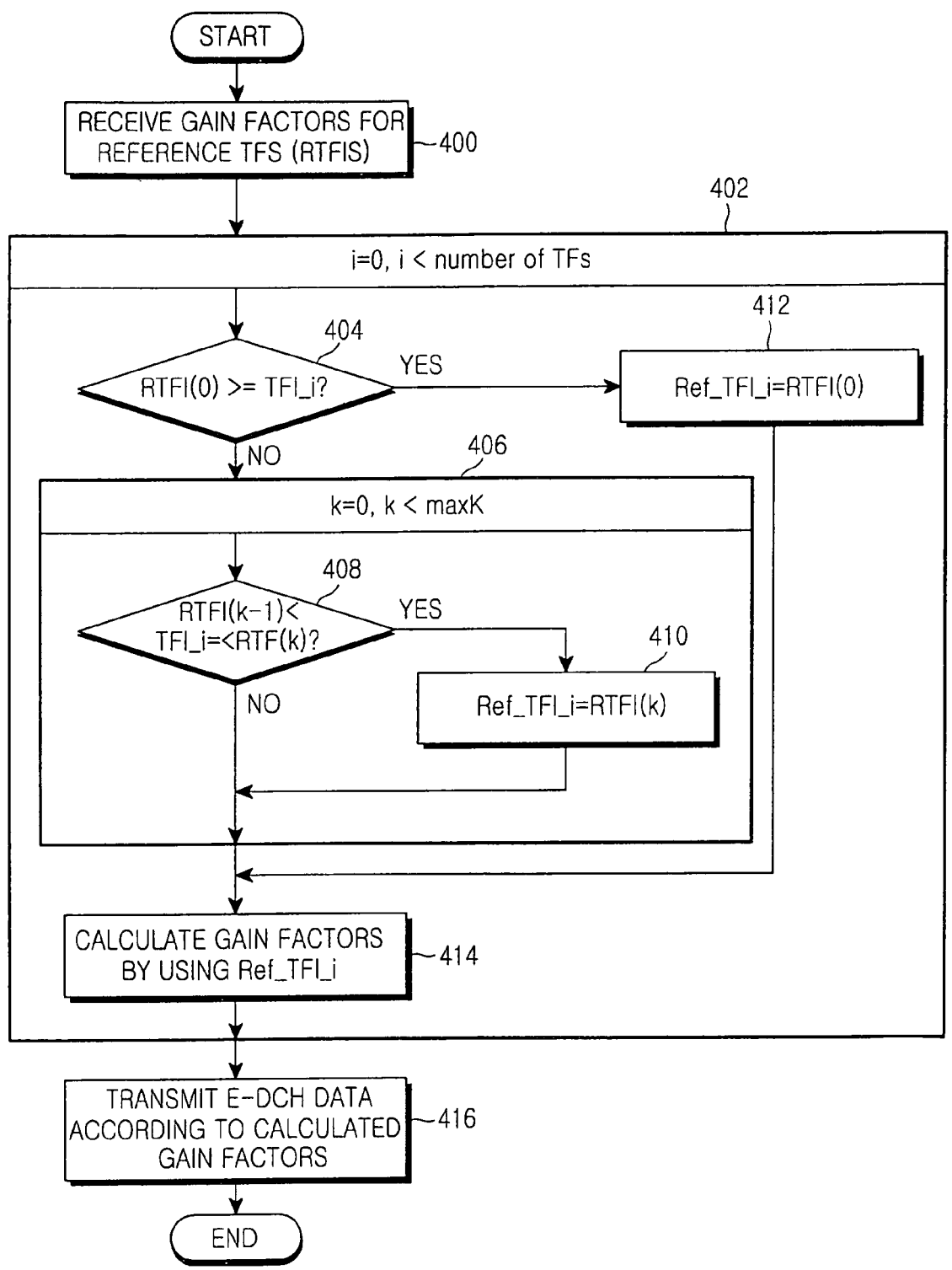
FIG. 12 is a flowchart illustrating an operation of configuring gain factors of a UE in accordance with the second embodiment of the present invention.

FIG. 12 is a flowchart illustrating an operation of configuring gain factors of a UE in accordance with Example 2 of the present invention. Here, a UE stores a TF set prearranged between the UE and a network.

Referring to FIG. 12, in step 400, the UE receives gain factor values for maxK TFs from the network through RRC signaling. Here, RTFI denotes indexes of the signaled TFs, and are represented by RTFI(0) to RTFI(maxK−1). In step 402, in order to calculate a gain factor for each TF of the overall TF set, the UE repeats steps 404 and 414 as many times corresponding to the number of the TFs of the TF set while increasing i one by one from 0. Here, i is an integer equal to or greater than 0 and smaller than the number of TFs of the overall TF set. At this time, step 402 may be omitted for TFIs the same as RTFIs in step 400.

In step 404, the UE determines if TFI_i indicating an i-th TFI is equal to or smaller than RTFI(0) indicating the minimum reference TF. If so, the UE proceeds to step 412 to set Ref_TFI_i indicating a reference TFI of TFI_i to RTFI(0). On the contrary, if TFI_i is greater than RTFI(0) in step 404, the UE repeats step 408 as many as maxK times while increasing k one by one from 0 in step 406, in order to compare TFI_i with maxK RTFIs. Here, k is an integer equal to or greater than 0 and smaller than maxK−1. In step 408, the UE determines if TFI_i is greater than RTFI(k−1) and is equal to or smaller than RTFI(k). If TFI_i is greater than RTFI(k−1) and is equal to or smaller than RTFI(k) for a specific k, Ref_TFI_i is set to RTFI(k) in step 410.

In step 414, the UE calculates a gain factor for TFI-i by applying the gain factor for Ref_TFI_i, determined for TFI-i, to Equation (4).

In step 416, the UE transmits E-DCH data according to the gain factors calculated in step 414 or signaled in step 400.

EXAMPLE 3

In Example 3, when it is intended to use the computed gain factor scheme, a TF is chosen for the E-DCH, and a signaled TF nearest to the chosen TF, from among signaled TFs, is selected as a reference TF.

A TF set comprising of 18 TFs as stated above in connection with FIG. 5 is used for explaining this Example. Of such a TF set, gain factors for 3 TFIs, that is, TFI 1, TFI 6 and TFI 14 are notified as shown in FIG. 13.

Referring to FIG. 13, the first column denotes Indicators successively assigned to signaled TFs, that is, k, the second column denotes original indicators of the signaled TFs, that is, RTFI(k), third column denotes the TB sizes of the signaled TFs, and the fourth column denotes gain factors for the signaled TFs. In this way, only by signaling gain factors for some TFs, that is, TFI 1, TFI 6 and TFI 14, a UE can configure a reference TF for each TF from TFI 0, a gain factor of which is not signaled, to calculate its gain factor by using the reference TF.

If it is intended to derive a gain factor for TFI 0, RTFI(0)=1 of the signaled TFs, which is nearest to TFI 0, becomes a reference TF for TFI 0. Similarly, in a case of TFI 2, RTFI(0)=1, which is nearest to TFI 2, becomes a reference TF for TFI 2. In a case of TFI 10, since TFI 10 lies between RTFI(1)=6 and RTFI(2)=14 and has the same spacing from both of them, prearranged rules are applied. For example, if it is prescribed that a lower RTFI is selected when spacing from both RTFIs is the same, a reference TF of TFI 10 becomes RTFI(1)=6. By applying the same principle to all TFs included in the TF set, reference TFs for the respective TFs are selected as in FIG. 14.

As shown in FIG. 14, TFIs 1, 6 and 14 are the signaled TFs, the other TFIs are mapped to reference TFIs representing corresponding reference TFs, respectively. Here, if Ref_TFI_i denotes a reference TFI selected for an i-th TF, Ref_TFI_0, Ref_TFI_2 and Ref_TFI_3 are TFI 1=RTFI(0), Ref_TFI_4, Ref_TFI_5 and Ref_TFI_7 to Ref_TFI_10 are TFI 6=RTFI(1), and Ref_TFI_11 to Ref_TFI_13 and Ref_TFI_15 Ref_TFI_17 are TFI 14=RTFI(2). Gain factors for the non-signaled TFIs are calculated according to a gain factor for the corresponding reference TFI.

Figure 15:
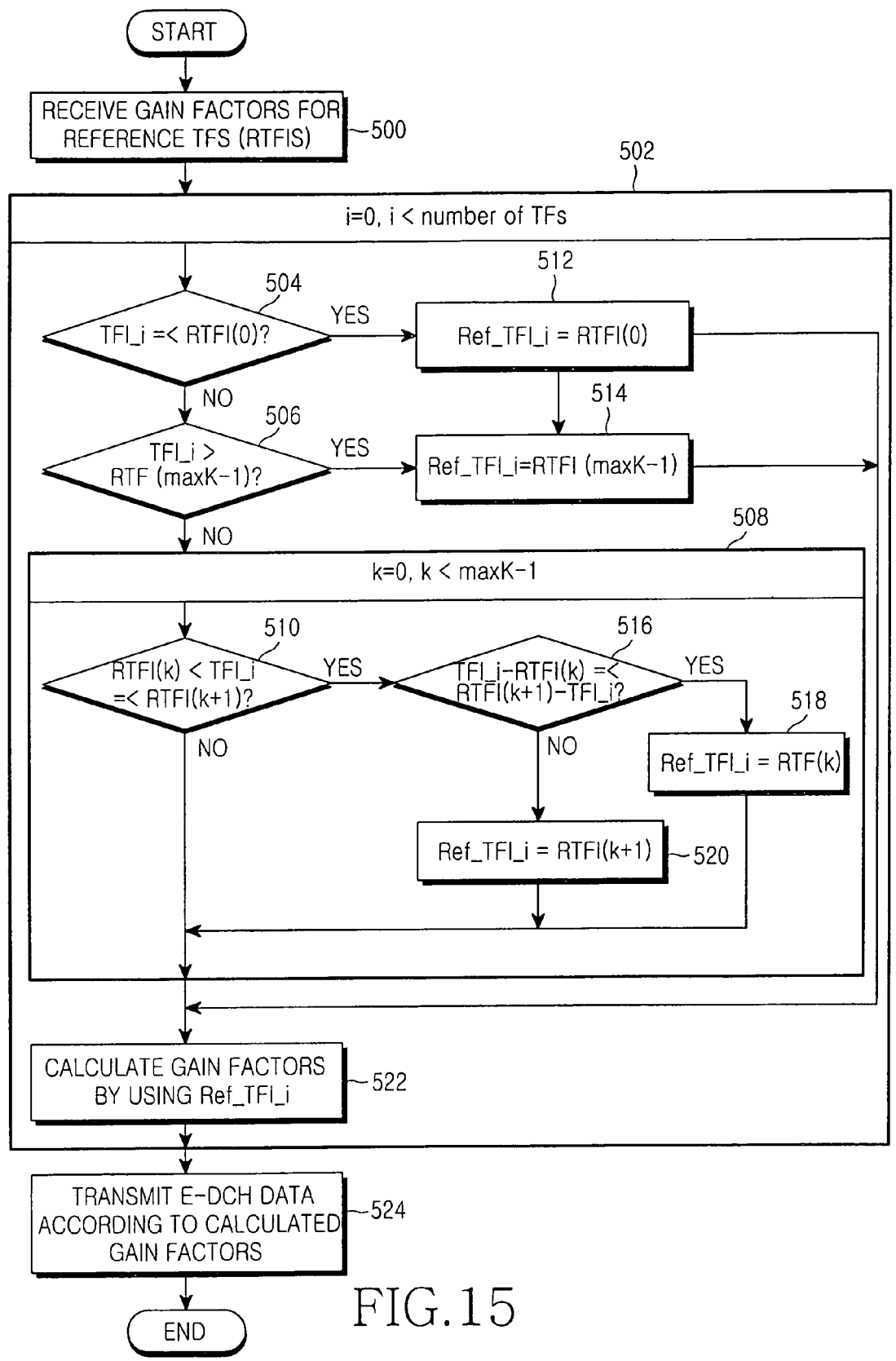
FIG. 15 is a flowchart illustrating an operation of configuring gain factors of a UE in accordance with the third embodiment of the present invention.

FIG. 15 is a flowchart illustrating an operation of configuring gain factors of a UE in accordance with Example 3 of the present invention. Here, a UE stores a TF set prearranged between the UE and a network.

Referring to FIG. 15, in step 500, the UE receives gain factor values for maxK TFs from the network through RRC signaling. Here, RTFI denotes indexes of the signaled TFs, and are represented by RTFI(0) to RTFI(maxK−1). In step 502, in order to calculate a gain factor for each TF of the overall TF set, the UE repeats steps 504 and 522 as many as times corresponding to the number of the TFs of the TF set while increasing i one by one from 0. Here, i is an integer equal to or greater than 0 and smaller than the number of TFs of the overall TF set. At this time, step 502 may be omitted for TFIs the same as RTFIs in step 500.

In step 504, the UE compares TFI_i indicating an i-th TFI with RTFI(0) indicating the minimum reference TF. If TFI-i is equal to or smaller than RTFI(0), the UE proceeds to step 512 to set Ref_TFI_i indicating a reference TFI of TFI_i to RTFI (0). On the contrary, if TFI_i is greater than RTFI(0) in step 504, the UE compares TFI_i with RTFI(maxK−1) indicating the maximum reference TF. If TFI-i is greater than RTFI (maxK−1), the UE proceeds to step 514 to set Ref_TFI_i to RTFI(maK−1). If TFI-i is greater than RTFI(0) and is equal to or smaller than RTFI(maxK−1), the UE repeats step 510 as many as (maxK−1) times while increasing k one by one from 0, as shown in step 508. Here, k is an integer equal to or greater than 0 and smaller than maxK−1.

In step 510, the UE determines if TFI_i is greater than RTFI(k) and is equal to or smaller than RTFI(k+1). If TFI 1 is greater than RTFI(k) and is equal to or smaller than RTFI(k+1) for a specific k, the UE proceeds to step 516 to determine which of RTFI(k) and RTFI(k+1) is nearest to TFI-i. To this end, the UE compares a difference between TFI-i and RTFI (k) with a difference between TFI-i and RTFI(k+1). If {RTFI (k+1)−TFI-i} is greater than {RTFI(k)−TFI-i}, then Ref_T-FI_i is set to RTFI(k) in step 518. In contrast, if {RTFI(k)−TFI-i} is greater than {RTFI(k+1)−TFI-i}, then Ref_TFI_i is set to RTFI(k+1) in step 520. If the two differences are the same, then Ref_TFI_i is set to RTFI(k) in step 518. In an alternative example, Ref_TFI_i may be set to RTFI(k+1) if the two differences are the same.

In step 522, the UE calculates a gain factor for TFI-i by applying the gain factor for Ref_TFI_i, determined for TFI-i, to Equation (4).

In step 524, the UE transmits E-DCH data according to the gain factors calculated in step 522 or signaled in step 500.

Various comparative methods applicable to Example 3 are presented in the following Equations (5) to (7):

$$\text{if } \log(\text{TFI-i}) - \log(\text{RTFI}(k)) =< \log(\text{RTFI}(k+1)) - \log(\text{TFI\_i}) \quad (5)$$
$$\quad \text{Ref\_TFI\_i} = \text{RTFI}(k)$$
$$\text{else} \quad \text{Ref\_TFI\_i} = \text{RTFI}(k+1)$$

In Equation (5), a RTFI having a small difference between logarithmic values is selected.

$$\text{if } \text{TB(TFI-i)} - \text{TB(RTFI}(k)) < \text{TB(RTFI}(k+1)) - \text{TB(TFI\_i)} \quad (6)$$
$$\quad \text{Ref\_TFI\_i} = \text{RTFI}(k)$$
$$\text{else} \quad \text{Ref\_TFI\_i} = \text{RTFI}(k+1)$$

where, TB(TFI_i) denotes TB size corresponding to TFI_i. Thus, in Equation (6), a RTFI having a small difference between TB sizes is selected.

$$\text{if } \log(\text{TB(TFI-i)}) - \log(\text{TB(RTFI}(k))) < \log(\text{TB(RTFI}(k+1))) - \quad (7)$$
$$\quad\quad\quad\quad\quad\quad\quad\quad\quad\quad\quad\quad\quad\quad\quad \log(\text{TB(TFI\_i)})$$
$$\quad \text{Ref\_TFI\_i} = \text{RTFI}(k)$$
$$\text{else} \quad \text{Ref\_TFI\_i} = \text{RTFI}(k+1)$$

In Equation (7), a RTFI having a small difference between logarithmic values of TB sizes is selected.

EXAMPLE 4

In Example 4, a network, that is, a RNC notifies a UE of a gain factor for a preset TF, and the UE calculates the other TFs by using the preset TF as a reference TF. The RNC chooses at least one TF per physical channel to have it as a reference TF, and predetermines reference TFs of the other TFs as TFs having the same number of physical channels. Also, in Example 4, one gain factor is set to reference gain factors for TFs having the same number of physical channels, but another gain factor may be used for TFs, initial coding rate of which is higher, from among the TFs having the same number of physical channels.

A TF set comprising of 18 TFs as stated above in connection with FIG. 5 is used for explaining this Example. Of such a TF set, gain factors for 5 TFIs, that is, TFI 0, TFI 4, TFI 6, TFI 9 and TFI 13 are notified as shown in FIG. 16.

Referring to FIG. 16, the first column denotes Indicators successively assigned to signaled TFs, that is, k, the second column denotes original indicators of the signaled TFs, that is, RTFI(k), third column denotes the TB sizes of the signaled TFs, the fourth column denotes gain factors for the signaled TFs, the fifth column denotes the number of physical channels (DPDCH) for the signaled TFs, and the sixth column denotes initial coding rates of the signaled TFs. Here, when the number of physical channels is 6, TFI 13 is signaled so as to configure another gain factor for TFs having higher initial coding rates. In the drawing, it is prearranged that TFI 13 is used as a reference TFI of TFs having an initial coding rate of 0.5 or above.

As already described above, the signaled TFIs are regarded as reference TFIs (RTFIs). In this way, only by signaling gain factors for some TFs, that is, TFI 0, TFI 4, TFI 6, TFI 9 and TFI 13, a UE can configure a reference TF for each TF from TFI 0, a gain factor of which is not signaled, to calculate its gain factor by using the reference TF.

FIG. 17 illustrates reference TFs configured in accordance with Example 4 of the present invention.

Referring to FIG. 17, reference TFs of TFI 1 to TFI 3, that is, Ref_TFI_1 to Ref_TFI_3 are determined as TFI 0=RTFI (0) having the same number of physical channels. Similarly, a reference TF of TFI 5, that is, Ref_TFI_5 is determined as TFI 4=RTFI(1) having the same number of physical channels, and reference TFs of TFI 7 and TFI 8, that is, Ref_TFI_7 and Ref_TFI_8 are determined as TFI 6=RTFI(2) having the same number of physical channels.

Although TFI 9 to TFI 17 have the same number of physical channels, there are two signaled TFIs, that is, TFI 9=RTFI (3) and TFI 13=RTFI(4). Here, according to prearranged mapping rules, reference TFs of TFI 14 to TFI 17 having initial coding rates of 0.5 or above, that is, Ref_TFI_14 to Ref_TFI_17 are determined as TFI 13=RTFI(4), and reference TFs of TFI 10 to TFI 12, that is, Ref_TFI_10 to Ref_TFI_12 are determined as TFI 9=RTFI(3).

Figure 18:
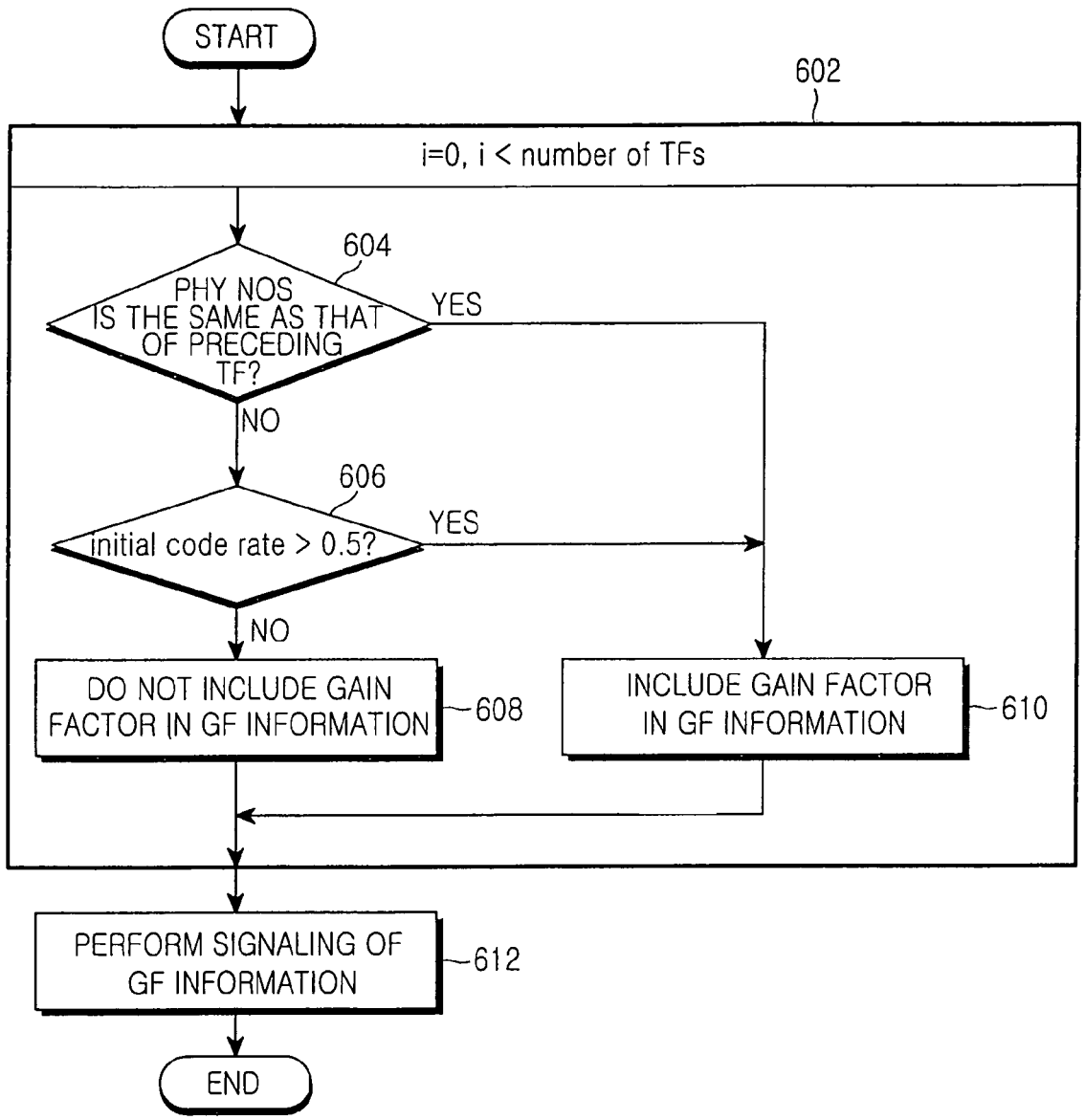
FIG. 18 is a flowchart illustrating an operation of a RNC in accordance with an exemplary embodiment of the present invention.

FIG. 18 is a flowchart illustrating an operation of a RNC in accordance with Example 4 of the present invention. Here is shown an operation in a case where the first TF of TFs having the same number of physical channels is signaled as a reference TF.

Referring to FIG. 18, in step 602, a RNC repeats step 604 as many as times corresponding to the number of TFs of the overall TF set while increases i one by one from 0, in order to generate information on gain factors for the TFs of the overall TF set. Here, i is an integer equal to or greater than 0 and smaller than the number of TFs of the overall TF set.

First, in step 604, the RNC compares the number of physical channels for an i-th TF with that for a preceding TF, that is, an (i−1)-th TF. If the two number of physical channels are not the same as each other, the RNC proceeds to step 610. In a case of the first TF, the RNC directly proceed to step 610 because there is no preceding TF. In step 610, the RNC include the i-th TF in gain factor information to be signaled to a UE. That is, the gain factor information comprises a gain factor for the i-th TF.

If the two number of physical channels are the same as each other in step 604, the RNC proceeds to step 606 to compare an initial coding rate of the i-th TF with a predetermined threshold, for example, 0.5. If the initial coding rate of the i-th TF does not exceed 0.5, the RNC proceeds to step 608 not to include the gain factor of the i-th TF in the gain factor information. In contrast, if the initial coding rate of the i-th TF exceeds 0.5, the RNC proceeds to step 610 to include the gain factor of the i-th TF in the gain factor information.

If the repetition operations for all the TFs of the TF set are completed, the RNC proceeds to step 612 to signal the gain factor information generated in step 602 to the UE. In other words, the RNC signals gain factors for TFs, having the same number of physical channels as that of the preceding TFs and having initial coding grated above the threshold, to the UE.

Hereinafter, UE operation for preferably implementing Example 4 is described.

A UE receives gain factor values for maxK TFs from a RNC through RRC signaling. The signaled TFs are regarded as reference TFs. The UE checks if there is reference TFs having the same number of physical channels as that of the respective TFs of the overall TF set. For example, if a reference TF having the same number of physical channels as that of TFI_i is one of the signaled TFs, that is, RTFI(k), the UE calculates a gain factor of TFI_i by applying a gain factor of RFFI(k) to Equation (4). In addition, if there are two reference TFs having the same number of physical channels as that of TFI_i that is, RTFI(k) and RTFI(k+1), the UE checks an initial coding rate of TFI_i. That is, if the initial coding rate exceeds a predetermined threshold, the UE calculates the gain factor of TFI_i by using the signaled gain factor for an upper reference TF, that is, RTFI(k+1). In the preceding example, the UE calculates the gain factors for TFs having initial coding rated above 0.5 by using the gain factor of RTFI(4)=TFI 13. In contrast, if the initial coding rate does not exceed the predetermined threshold, the UE calculates the gain factor of TFI_i by using the signaled gain factor for a lower reference TF, that is, RTFI(k).

According to the present invention as describe above, since a UE does not receive mapping information on reference TFs for all available TFs, but determines a reference TF for each TF according to predefined rules, upper signaling overhead required for signaling gain factors for a TF ser can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for configuring gain factors in a radio telecommunication system, the method comprising the steps of:
   receiving first gain factors for first TFs corresponding to a part of a TF set including a plurality of indexed TFs available for an uplink service;
   if an index of a second TF other than the first TFs in the TF set is equal to or greater than a greatest index among indexes of the first TFs, determining that one of the first TFs having the greatest index becomes a reference TF corresponding to the second TF;
   if an index of the second TF other than the first TFs in the TF set is less than the greatest index, and the index of the second TF is equal to or greater than a k-th index and is less than a (k+1)-th index of the indexes of the first TFs, determining that one of the first TFs having the k-th index becomes the reference TF corresponding to the second TF; and
   calculating a second gain factor for the second TF by using the first gain factor for the determined reference TF, the second gain factor being used for transmitting or receiving uplink data.

2. The method as claimed in claim 1, wherein the second gain factor is calculated by means of the following equation, $$\beta_{e,j} = \beta_{e,ref} \sqrt{\frac{L_{ref}}{L_j}} \sqrt{\frac{N_{info,j}}{N_{info,ref}}}$$

where, $\beta_{ej}$ denotes the second gain factor, $\beta_{e,ref}$ denotes the first gain factor for the reference TF, $L_j$ denotes the number of physical channels necessary for the second TF, $L_{ref}$ denotes the number of physical channels necessary for the reference TF, $N_{info,ref}$ denotes TB size of the reference TF, and $N_{info,j}$ denotes TB size of the second TF.

3. The method as claimed in claim 1, wherein the first gain factors for the first TFs are signaled from a RNC to a UE and a Node B.

4. A method for configuring gain factors in a radio telecommunication system, the method comprising the steps of:
   receiving first gain factors for first TFs corresponding to a part of a TF set including a plurality of indexed TFs available for an uplink service;
   if an index of a second TF other than the first TFs in the TF set is smaller than a first index among the indexes of the first TFs, determining that one of the first TFs having the first index becomes a reference TF corresponding to the second TF; and
   calculating a second gain factor for the second TF by using the first gain factor for the determined reference TF, the second gain factor being used for transmitting or receiving uplink data;
   wherein if an index of the second TF other than the first TFs in the TF set is equal to or greater than the first index, and the index of the second TF is greater than a (k−1)-th index and is equal or less than a k-th index of the indexes of the first TFs, determining that the first TF having the k-th index becomes the reference TF corresponding to the second TF.

5. The method as claimed in claim 4, wherein the second gain factor is calculated by means of the following equation, $$\beta_{e,j} = \beta_{e,ref} \sqrt{\frac{L_{ref}}{L_j}} \sqrt{\frac{N_{info,j}}{N_{info,ref}}}$$

where, $\beta_{e,j}$ denotes the second gain factor, $\beta_{c,ref}$ denotes the first gain factor for the reference TF, $L_j$ denotes the number of physical channels necessary for the second TF, $L_{ref}$ denotes the number of physical channels necessary for the reference TF, $N_{info,ref}$ denotes TB size of the reference TF, and $N_{info,j}$ denotes TB size of the second TF.

6. The method as claimed in claim 4, wherein the first gain factors for the first TFs are signaled from a RNC to a UE and a Node B.

* * * * *

UNITED STATES PATENT AND TRADEMARK OFFICE
CERTIFICATE OF CORRECTION

| | |
|---|---|
| PATENT NO. | : 7,668,563 B2 |
| APPLICATION NO. | : 11/326595 |
| DATED | : February 23, 2010 |
| INVENTOR(S) | : Heo et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Seventh Day of December, 2010

David J. Kappos
*Director of the United States Patent and Trademark Office*